US009879649B2

(12) United States Patent
Inoue

(10) Patent No.: US 9,879,649 B2
(45) Date of Patent: Jan. 30, 2018

(54) FLOATING OFFSHORE WIND TURBINE

(75) Inventor: Shunji Inoue, Tokyo (JP)

(73) Assignee: NATIONAL INSTITUTE OF MARITIME, PORT AND AVIATION TECHNOLOGY, Tokyo (JP)

( * ) Notice: Subject to any disclaimer, the term of this patent is extended or adjusted under 35 U.S.C. 154(b) by 618 days.

(21) Appl. No.: 13/883,560

(22) PCT Filed: Nov. 4, 2011

(86) PCT No.: PCT/JP2011/006177
§ 371 (c)(1),
(2), (4) Date: Jun. 30, 2013

(87) PCT Pub. No.: WO2012/060108
PCT Pub. Date: May 10, 2012

(65) Prior Publication Data
US 2013/0272846 A1 Oct. 17, 2013

(30) Foreign Application Priority Data

Nov. 5, 2010 (JP) ................................ 2010-248511

(51) Int. Cl.
*F03B 17/06* (2006.01)
*F03D 13/25* (2016.01)
(Continued)

(52) U.S. Cl.
CPC .............. *F03B 17/06* (2013.01); *B63B 1/048* (2013.01); *B63B 21/50* (2013.01); *B63B 39/00* (2013.01);
(Continued)

(58) Field of Classification Search
CPC ...... B63B 2035/4433; B63B 2035/446; B63B 21/50; B63B 21/502; B63B 2021/504;
(Continued)

(56) References Cited

U.S. PATENT DOCUMENTS 7,296,971 B2 * 11/2007 Borgen .................. F03D 11/04
416/85
7,612,462 B2 * 11/2009 Viterna .................. B63B 21/50
290/42
(Continued)

FOREIGN PATENT DOCUMENTS

EP 1617076 A1 1/2006
EP 2080899 A1 7/2009
(Continued)

OTHER PUBLICATIONS

International Search Report for PCT/JP2011/006177, dated Feb. 7, 2012.
(Continued)

*Primary Examiner* — Justin Seabe

(57) ABSTRACT

The present invention provides a floating offshore wind turbine capable of suppressing yawing of a nacelle caused by a gyro effect which is a cause of adverse influence of power generating efficiency of a wind turbine and endurance of devices thereof. The floating offshore wind turbine includes a rotor which is rotated by wind, a nacelle in which a rotation shaft of the rotor is accommodated, and a tower including a turning seated bearing which supports the nacelle such that the nacelle can turn with respect to a sea surface to exert a weathercock effect. The tower is provided with yawing suppressing means which suppresses yawing of the nacelle. According to this, it is possible to suppress the yawing of the nacelle generated by a gyro effect caused by yawing generated in the floating body by waves of the sea surface.

5 Claims, 18 Drawing Sheets

(51) Int. Cl.
  *B63B 1/04* (2006.01)
  *B63B 21/50* (2006.01)
  *B63B 39/00* (2006.01)
  B63B 35/44 (2006.01)
  B63B 39/06 (2006.01)

(52) U.S. Cl.
  CPC ........ *F03D 13/25* (2016.05); *B63B 2035/442* (2013.01); *B63B 2035/446* (2013.01); *B63B 2039/067* (2013.01); *F05B 2240/2213* (2013.01); *F05B 2240/917* (2013.01); *F05B 2240/93* (2013.01); *F05B 2240/95* (2013.01); *F05B 2260/964* (2013.01); *Y02E 10/28* (2013.01); *Y02E 10/721* (2013.01); *Y02E 10/725* (2013.01); *Y02E 10/727* (2013.01); *Y02E 10/728* (2013.01)

(58) Field of Classification Search
  CPC .... F03D 13/25; Y02E 10/727; F05B 2240/95; F05B 2240/917; F05B 2240/93; F05B 2260/96
  See application file for complete search history.

(56) References Cited

U.S. PATENT DOCUMENTS

| | | | | |
|---|---|---|---|---|
| 7,686,543 | B2 * | 3/2010 | They | B63B 21/50 114/264 |
| 8,192,160 | B2 * | 6/2012 | Garcia Lopez | F03D 11/04 416/1 |
| 8,471,396 | B2 * | 6/2013 | Roddier | B63B 35/44 290/44 |
| 8,641,369 | B2 * | 2/2014 | Rodriguez Tsouroukdissian | F03D 7/02 415/119 |
| 2004/0253093 | A1 | 12/2004 | Shibata et al. | |
| 2008/0084068 | A1 | 4/2008 | Shibata et al. | |
| 2009/0092449 | A1 | 4/2009 | Sveen | |
| 2009/0142178 | A1 * | 6/2009 | Nieuwenhuizen | E04H 12/085 415/2.1 |

FOREIGN PATENT DOCUMENTS

| | | |
|---|---|---|
| JP | 2002-517660 A | 6/2002 |
| JP | 2003-176774 A | 6/2003 |
| JP | 2005-526213 A1 | 9/2005 |
| JP | 2007-146858 A | 6/2007 |
| JP | 2007-198167 A | 8/2007 |
| JP | 2008-540902 A | 11/2008 |
| JP | 2008-546948 A | 12/2008 |
| JP | 2009-248792 A | 10/2009 |
| JP | 2010-014105 A | 1/2010 |
| JP | 2010-216273 A | 9/2010 |
| WO | 1999/63219 A1 | 12/1999 |
| WO | 2003/098038 A1 | 11/2003 |
| WO | 2006/121337 A1 | 11/2006 |
| WO | 2007/119953 A1 | 10/2007 |
| WO | WO 2009131826 A2 * 10/2009 ............ B63B 35/44 |
| WO | WO 2010048560 A2 * 4/2010 ............ B63B 35/44 |

OTHER PUBLICATIONS

The Extended European Search Report for EP Application No. 11837762.1, dated Dec. 2, 2014.

European Patent Office, Office Action for EP Patent Application No. 11837762.1, dated Aug. 8, 2016.

* cited by examiner (a)

(b)

FLOATING OFFSHORE WIND TURBINE

TECHNICAL FIELD

The present invention relates to a floating offshore wind turbine capable of efficiently suppressing yawing (turning/oscillating motion) of a nacelle in which a rotation shaft of a rotor is accommodated and yawing of a floating body.

BACKGROUND TECHNIQUE

In conventional wind turbines, to change an orientation of a wind turbine in accordance with change in a wind direction, an active control apparatus which is combined with a wind direction sensor is used. For example, there is employed a configuration that a wind turbine is turned by a power apparatus in accordance with a result of measurement of the wind direction sensor, and the wind turbine is held at a position suitable for the wind direction. To simplify a system of the entire wind turbine, the active control apparatus is omitted in some cases. When the active control apparatus is to be omitted, a rotation shaft of a rotor of the wind turbine is supported on a horizontal plane such that the rotation shaft can freely turn, and the orientation of the wind turbine is changed by a weathercock effect to follow the change in the wind direction.

In the wind turbine, the rotor receives wind and rotates, thereby generating electric power. If moment in a vertical direction is applied to a rotation axis of rotation of the rotor, gyro moment is generated in a direction cross at right angles to both the direction of the moment and the rotation axis of the rotor by a so-called gyro effect. For example, in a floating offshore wind turbine provided on a floating body which is floating in water, moment in the vertical direction is generated due to influence of waves. Hence, gyro moment is generated in a horizontal direction cross at right angles to the rotation axis of rotation of the rotor by the gyro effect.

In a floating offshore wind turbine including the active control apparatus, a nacelle is held by a floating body at a position matching with a wind direction. Therefore, rotation motion of the floating body rotating around a central axis of the floating body is generated by gyro moment caused by the gyro effect generated in the nacelle in which the rotation shaft of the rotor of the wind turbine is accommodated. Here, since motion of waves is repetitive motion, the floating body moves repetitively (yawing) together with the nacelle.

In a floating offshore wind turbine in which the active control apparatus is omitted, a rotation shaft of a rotor of a wind turbine is supported such that the rotation shaft can freely turn with respect to a floating body. Hence, yawing of a nacelle is generated by gyro moment caused by a gyro effect generated in the nacelle.

The present inventor found that moment caused by this gyro effect was a cause of an adverse influence exerted on power generating efficiency of the floating offshore wind turbine and endurance of devices thereof.

To prevent vibration generated in a wind turbine apparatus, it is proposed to employ various configurations (patent documents 1 to 3).

Patent document 1 describes a wind turbine apparatus. The wind turbine apparatus includes, as an active control apparatus of a nacelle, a whirling driving source which whirls a platform supported on an upper end of a tower and fixing means in a whirling direction. In this wind turbine apparatus, to suppress vibration generated in the tower or the like by resonance of a blades and resonance wind speed, patent document 1 describes a configuration that a vibration suppressing apparatus is provided.

In a wind turbine, to attenuate vibration action in an edge direction of blades of a rotor, patent document 2 describes a configuration that oscillation action attenuating means is disposed in a nacelle.

In a wind turbine device, to prevent vibration from being transmitted to a nacelle frame through a speed increasing gear box and to prevent vibration from being transmitted from the nacelle frame to the speed increasing gear box, patent document 3 describes a configuration that a vibration isolation damper is provided between the speed increasing gear box and the nacelle frame.

PRIOR ART DOCUMENT

Patent Document

[Patent Document 1] Japanese Patent Publication No. 2003-176774
[Patent Document 2] Japanese translation of PCT International Application, Publication No. 2002-517660
[Patent Document 3] Japanese translation of PCT International Application, Publication No. 2008-546948

SUMMARY OF THE INVENTION

Problem to be Solved by the Invention

Such a conventional wind turbine has a problem of vibration generated by rotation itself of the rotor and the like, but there are no conventional wind turbines which focus attention on oscillation of a nacelle generated by gyro moment caused by the gyro effect. Hence, the vibration motion suppressing means used in the wind turbine apparatuses described in these patent documents can not prevent yawing of the nacelle and the floating body generated by gyro moment caused by the gyro effect when the floating offshore wind turbine receives influence of waves.

Hence, it is an object of the present invention to provide a floating offshore wind turbine capable of preventing yawing of the nacelle and the floating body generated by gyro moment caused by the gyro effect, and capable of suppressing adverse influence on power generating efficiency of the wind turbine and endurance of devices thereof.

Means for Solving the Problem

A first aspect of the invention provides a floating offshore wind turbine which generates electricity using a floating body as a portion of a structure body on ocean comprising a rotor which is rotated by wind, a nacelle in which at least a rotation shaft of the rotor is accommodated, the structure body including turning means which supports the nacelle such that the nacelle can turn with respect to a water surface, and yawing suppressing means which suppresses yawing of the nacelle with respect to the water surface and using a hydrodynamic damper which suppresses yawing by mutual interference between a shape or a structure of the structure body and peripheral fluid as the yawing suppressing means. According to this aspect, the yawing suppressing means can suppress the yawing of the nacelle caused by a gyro effect. Also, the yawing suppressing means can suppress yawing of the nacelle which is induced by the gyro effect caused by pitching of the floating body on the ocean. According to the structure using this hydrodynamic damper, resistance to yawing is varied by resistance to water of the underwater hydrodynamic damper in accordance with a turning speed of the nacelle or the floating body, and it is possible to suppress the yawing.

According to a second aspect of the invention, in the floating offshore wind turbine of the first aspect, the nacelle is provided on a windward side as compared with the rotor. According to this aspect, the nacelle can be turned with respect to a water surface by a so-called weathercock effect, and an orientation of the rotation shaft can be made to conform to a wind direction.

According to a third aspect of the invention, in the floating offshore wind turbine of the second aspect, a coning angle is given to the rotor. According to this aspect, it is possible to further enhance the so-called weathercock effect.

According to a fourth aspect of the invention, in the floating offshore wind turbine of the first aspect, a hydraulic damper is further provided as the yawing suppressing means.

According to a fifth aspect of the invention, in the floating offshore wind turbine of the first aspect, a friction damper is further provided as the yawing suppressing means. If the hydraulic damper or the friction damper is used as the yawing suppressing means, resistance for suppressing the yawing of the nacelle can be varied in accordance with a turning speed of the nacelle.

According to an eighth aspect of the invention, in the floating offshore wind turbine of the first aspect, the floating body is moored by mooring lines.

According to a ninth aspect of the invention, in the floating offshore wind turbine of the eighth aspect, the floating body is formed into a substantially cylindrical shape, a pair of mooring lines composed of two mooring lines whose one ends are connected to two points on a circumference of a circle of the substantially cylindrical shape when the floating body is projected onto a horizontal plane is used as the mooring method, and the two mooring lines are formed into substantially tangent lines of the circle and extend on the same side. According to these aspects, it is possible to suppress rotation around a cylindrical center axis of the floating body.

According to a tenth aspect of the invention, in the floating offshore wind turbine of the first aspect, the nacelle is supported by the structure body such that a predetermined angle is formed between a horizontal plane and the rotation shaft of the rotor in a state where wind is not received so that the rotation shaft of the rotor in a state where wind is received becomes parallel to a wind direction. According to this aspect, the predetermined angle can be set while taking, into account, a fact that the wind turbine inclines when the rotor receives wind. Therefore, when electricity is generated, the rotation shaft of the rotor can be made parallel to a wind direction. Here, "a state where the rotor receives wind and the wind turbine inclines" means a state where the wind turbine is inclined by receiving wind of a typical wind speed which is assumed at a place where the wind turbine is installed. Examples of the typical wind speed are an average annual wind speed and a wind speed at which power generating efficiency becomes maximum.

Effect of the Invention

According to the floating offshore wind turbine of the present invention, since the yawing suppressing means can suppress yawing caused by a gyro effect, it is possible to suppress adverse influence by the yawing on the power generating efficiency of the wind turbine caused and endurance of devices thereof.

If the nacelle is provided on a windward side as compared with the rotor or a coning angle is given to the rotor, the nacelle can be turned by a so-called weathercock effect, the rotation shaft can be made to conform to a wind direction and the front face of the rotor can be in contradiction to the wind direction. Therefore, it is possible to enhance the power generating efficiency of the wind turbine. Further, it is possible to suppress yawing and to reduce a load of the yawing suppressing means.

If the hydraulic damper or the friction damper is used as the oscillating control means, resistance of the oscillating control means can be varied in accordance with a turning speed of the nacelle. Therefore, it is possible to suppress fast yawing of the nacelle caused by a gyro effect without suppressing slow yawing of the nacelle caused by a weathercock effect.

If the hydrodynamic damper which suppresses yawing by interference with surrounding fluid is used, resistance can be varied in accordance with a turning speed of the nacelle, the yawing generated in the nacelle or the floating body due to the gyro effect can be suppressed, pitching of the floating body can be suppressed, and power generating efficiency and endurance of devices can be enhanced.

The floating offshore wind turbine of the invention includes the yawing suppressing apparatus. Therefore, it is possible to enhance the power generating efficiency and endurance of the devices by suppressing the yawing of the nacelle caused by the gyro effect. It is also possible to suppress pitching of the floating body by reaction of the gyro effect.

If the floating body is moored by a mooring method which suppresses rotation motion of the floating body around its center axis, it is possible to effectively suppress yawing of the nacelle and pitching of the floating body caused by a gyro effect, and it is possible to enhance power generating efficiency and endurance of the devices.

If a predetermined angle is provided between a horizontal plane and the rotation shaft of the rotor in a state where the rotor does not receive wind, a side view direction of the rotation shaft of the rotor and a side view direction of wind can be substantially parallel to each other and can be made to substantially conform to each other when electricity is generated. Therefore, a rotation plane of the rotor can be made perpendicular to a wind direction substantially at right angles, and it is possible to enhance power generating efficiency.

Figure 1:
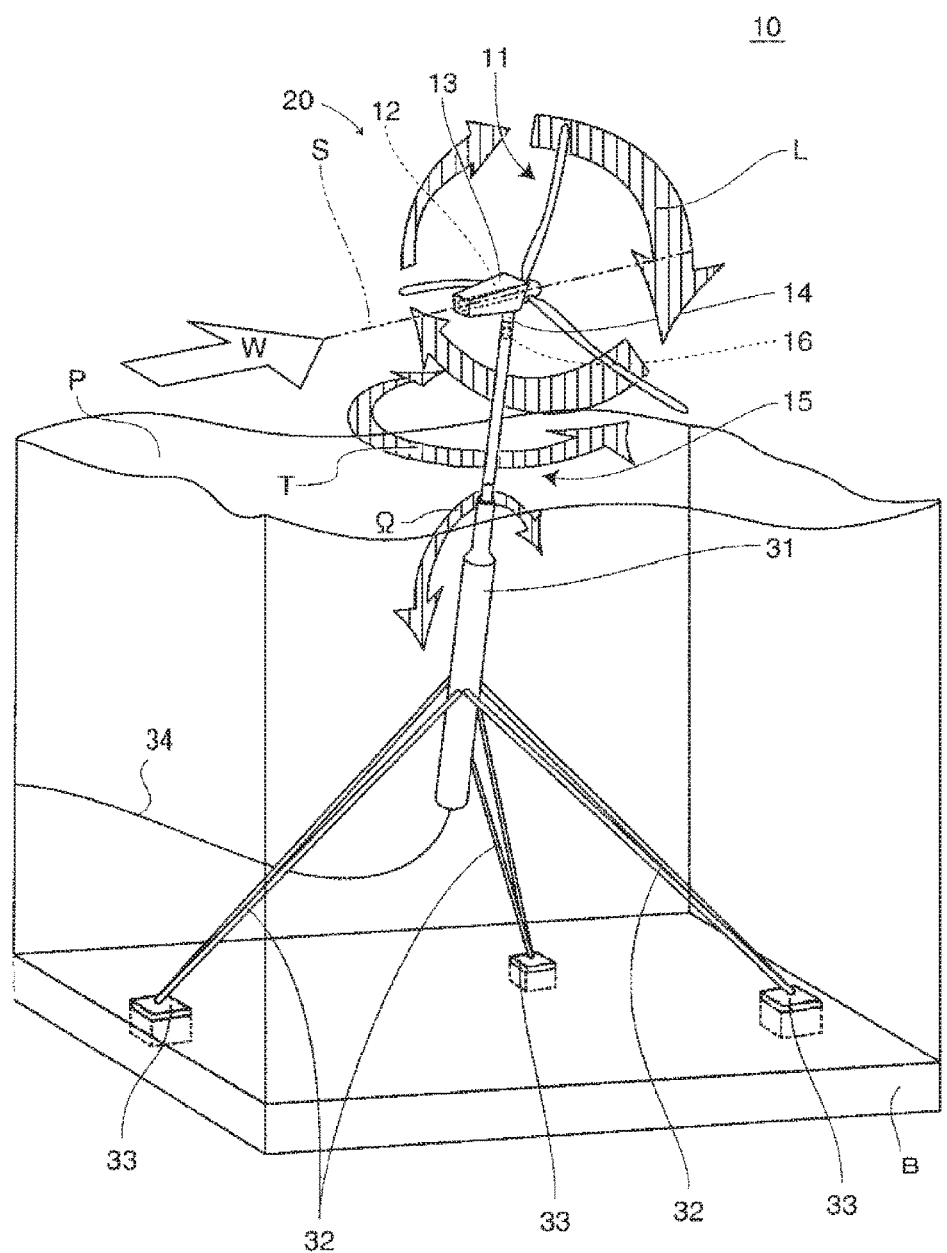
FIG. 1 is a schematic perspective view showing a configuration of a floating offshore wind turbine according to a first embodiment of the present invention.

EXPLANATION OF SYMBOLS 10, 40, 50, 60 floating offshore wind turbine
11 rotor
12 rotation shaft
13 nacelle
14 turning seated bearing (turning means)
15 tower (structure body)
16 yawing suppressing means
160 hydraulic damper
165 friction damper
20, 30 yawing suppressing apparatus
31 floating body
32 mooring line
41 structure body
42 turning means
44, 64 hydrodynamic damper
51A structure body upper portion
51B structure body lower portion
α coning angle
β predetermined angle

MODE FOR CARRYING OUT THE INVENTION (First Embodiment)

A first embodiment of the present invention will be described below with reference to FIGS. 1 to 8. In this embodiment, a case where the invention is carried out as a floating offshore wind turbine will be described.

FIG. 1 is a schematic perspective view showing a configuration of the floating offshore wind turbine 10 according to the first embodiment. As shown in FIG. 1, the floating offshore wind turbine 10 includes a floating body 31 provided with a yawing suppressing apparatus 20. The floating body 31 is moored to anchors 33 provided on a sea bottom B through mooring lines 32. A line coming out from a lower portion of the floating body 31 is an electric feeder line 34. A structure of the yawing suppressing apparatus 20 possessed by the floating offshore wind turbine 10 of the embodiment will be described with reference to FIG. 2.

Figure 2:
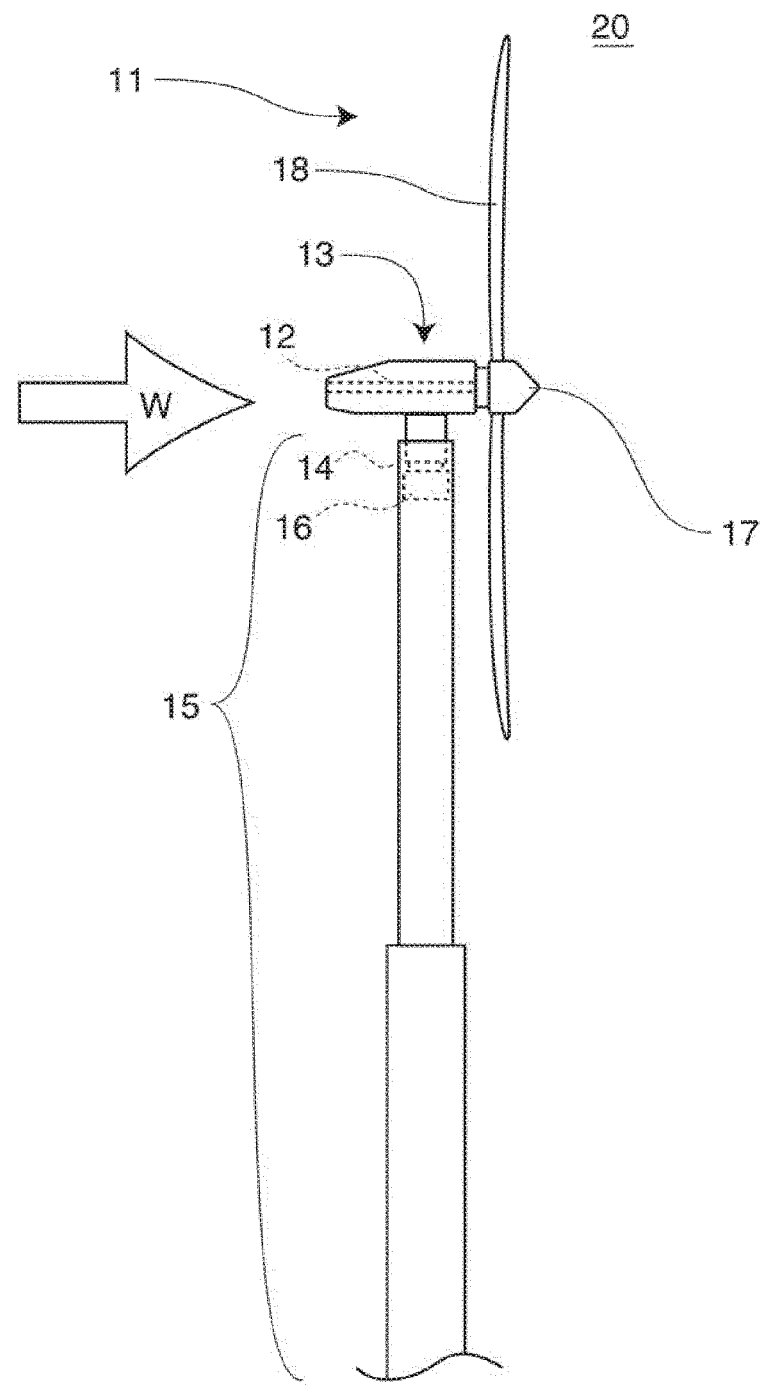
FIG. 2 is a side view of essential portions showing a structure of a yawing suppressing apparatus of a wind turbine according to the first embodiment of the invention.

FIG. 2 is a side view of essential portions showing a structure of the yawing suppressing apparatus 20 of the wind turbine 10 according to the first embodiment. As shown in FIG. 2, the yawing suppressing apparatus 20 is composed of a rotor 11 which is rotated by wind, a nacelle 13 in which a rotation shaft 12 of the rotor 11 is accommodated, a tower (structure body) 15 having a turning seated bearing (turning means) 14 which supports the nacelle 13 such that the nacelle 13 can turn with respect to a water surface or a ground surface, and a yawing suppressing means 16 which suppress yawing of the nacelle 13 with respect to the water surface.

The rotor 11 includes a hub 17 which is radially provided with a plurality of blades 18, and the rotation shaft 12 connected to the hub 17. The rotation shaft 12 is rotatably supported in the nacelle 13. If the rotor 11 receives wind, the rotation shaft 12 rotates and a generator (not shown) provided in the nacelle 13 generates electricity. A hollow arrow w in FIG. 2 shows a wind direction. In the yawing suppressing apparatus 20 of the embodiment, the rotor 11 is provided on a leeward side as compared with the nacelle 13. According to this configuration, it is possible to effectively generate a so-called weathercock effect in which a side view direction of the rotation shaft 12 conforms to a wind direction by yawing of the nacelle 13 provided on the turning seated bearing 14.

The rotation shaft 12 rotates upon receiving wind W, and the rotation shaft 12 is accommodated in the nacelle 13. The nacelle 13 also includes electricity generating means (not shown), such as a gear box (not shown) which increases a rotation speed of the rotation shaft 12 and transmits the rotation to the generator, possessed by a wind turbine device. The nacelle 13 is supported by the turning seated bearing 14 provided on the tower 15 such that the nacelle 13 can turn in a direction parallel to a sea surface P. According to this configuration, a direction of the rotation shaft 12 can be varied by yawing of the nacelle 13 in accordance with change in a wind direction W, and a rotation plane of the blades 18 of the rotor 11 can be in contradiction to wind.

When a force in the vertical direction is applied by waves while the rotor 11 is rotating, the yawing suppressing means 16 suppresses yawing of the nacelle 13 generated by a gyro effect. Attention is paid to the yawing of the nacelle 13 caused by the gyro effect, the yawing suppressing means 16 is provided. Since the yawing suppressing means 16 can suppress the yawing of the nacelle 13, it becomes possible to enhance power generating efficiency of the floating offshore wind turbine 10 and to enhance endurance of devices thereof. Although the tower 15 is provided with the yawing suppressing means 16 in this embodiment, instead thereof, the nacelle 13 may be provided with the yawing suppressing means 16.

When the yawing suppressing apparatus 20 is provided on a wind turbine apparatus on land instead of the floating offshore wind turbine 10, the nacelle 13 is supported by the turning seated bearing 14 such that it can turn with respect to a ground surface. If moment in the vertical direction is applied for any reason, the yawing suppressing means 16 can suppress yawing of the nacelle 13. The above-described weathercock effect is also of assistance in reducing a load of the yawing suppressing means 16.

Next, a mechanism for generating yawing in the nacelle 13 of the floating offshore wind turbine 10 by the gyro effect on the ocean will be described with reference to FIGS. 1 and 3. If a rotating object (substance) rotates in a direction cross at right angles to a rotation axis, moment acts in directions intersecting with each other at right angles. This moment is called gyro moment. An effect for generating the gyro moment is called a gyro effect.

$$\Omega \times L = T$$

Ω: angular velocity of pitching motion
L: angular momentum of rotating object
T: gyro moment When the rotor 11 is rotating motion L, if motion generating a restoring force via yawing of the floating body 31 by waves of a sea surface P is generated, whereby a pitching Ω is generated, the rotor 11 yaws in the vertical direction cross at right angles to the rotation axis S. According to this, gyro moment acts in the horizontal direction cross at right angles to both the rotation axis S of the rotor 11 and the vertical direction. In the floating offshore wind turbine 10, since the nacelle 13 can turn by the turning seated bearing 14, yawing of the nacelle 13 is generated in a direction shown by T in FIG. 1 by this gyro moment.

Figure 3:
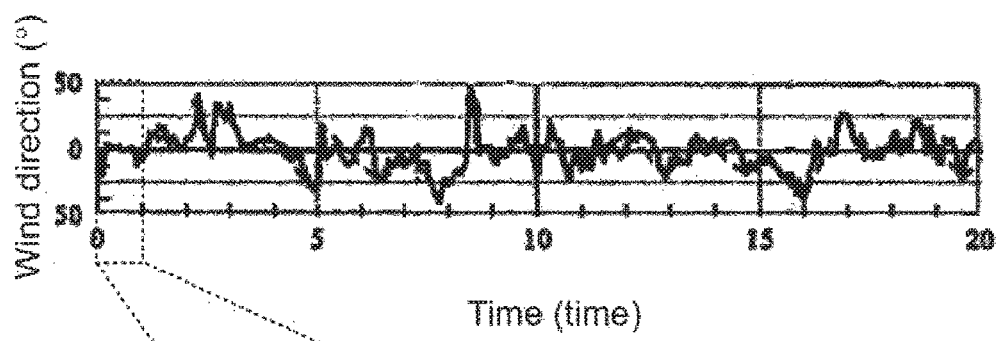
FIG. 3 shows a relation between change in a wind direction on the ocean and a deflection angle of a floating body on water caused by influence of waves, wherein (a) is a graph showing change in a wind direction and (b) is a graph showing change in a deflection angle.
Figure 3:
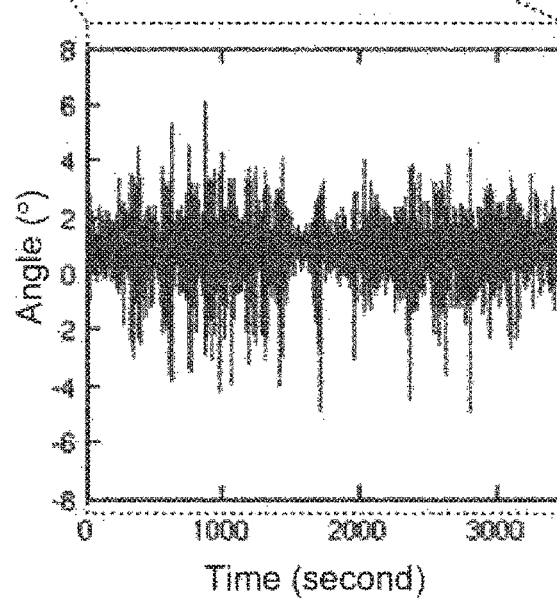

FIG. 3 shows a relation between change in a wind direction on the ocean and a deflection angle of the floating body on water caused by influence of waves, wherein (a) is a graph showing change in a wind direction and (b) is a graph showing change in a deflection angle. Portions surrounded by broken lines in the graph (a) as well as the graph (b) show change during one hour. If the graphs (a) and (b) of FIG. 3 are compared with each other, it can be found that change in a wind direction is generated while taking a long time, and change in a deflection angle caused by influence of waves is generated in a short time. That is, a turning speed of the nacelle 13 caused by change in a wind direction is slow, and a speed of yawing of the nacelle 13 caused by a gyro effect caused due to influence of waves and so on is fast.

Since the deflection angle caused by the influence of waves is varied with the short period, yawing of the nacelle 13 is induced by the gyro effect. The yawing of the nacelle 13 adversely affects the power generating efficiency of the wind turbine and endurance of the devices.

To selectively suppress yawing of the nacelle 13 caused by the gyro effect while allowing the nacelle 13 to turn as a wind direction is varied, it is preferable that means whose resistance is varied in accordance with a turning speed of the nacelle 13 is used as the yawing suppressing means 16. According to this, a so-called weathercock effect can be exerted without generating an attenuation effect for slow yawing of the nacelle 13 supported by the turning seated bearing 14 caused by change in a wind direction which is varied while taking a relatively long time. It is possible to allow an attenuation effect to exert for yawing of the nacelle 13 which is caused by waves with a short period, and thus, it is also possible to selectively inhibit yawing of the nacelle 13.

Since the floating offshore wind turbine 10 of the embodiment can suppress the yawing of the nacelle 13 by the yawing suppressing means 16, it becomes possible to suppress the adverse influence.

If the yawing suppressing apparatus 20 including the yawing suppressing means 16 is used, it is possible to restrain yawing from generating in the nacelle 13 by a gyro effect caused by pitching of the floating body 31 caused by waves. Further, by suppressing the yawing of the nacelle 13, it is also possible to suppress pitching of the floating body 31 caused by reaction of the gyro effect.

Figure 4A:
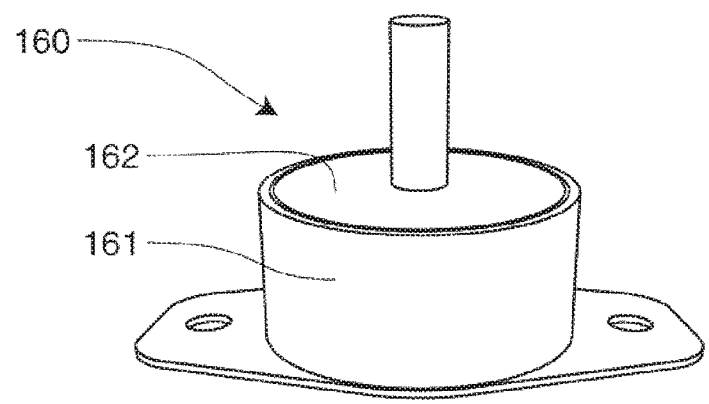
FIG. 4A is a schematic perspective view showing a configuration of a hydraulic damper.
Figure 4B:
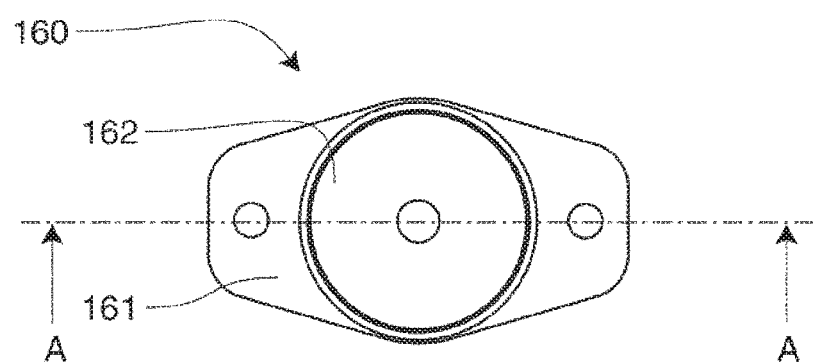
FIG. 4B is a schematic front view showing a configuration of the hydraulic damper.
Figure 4C:
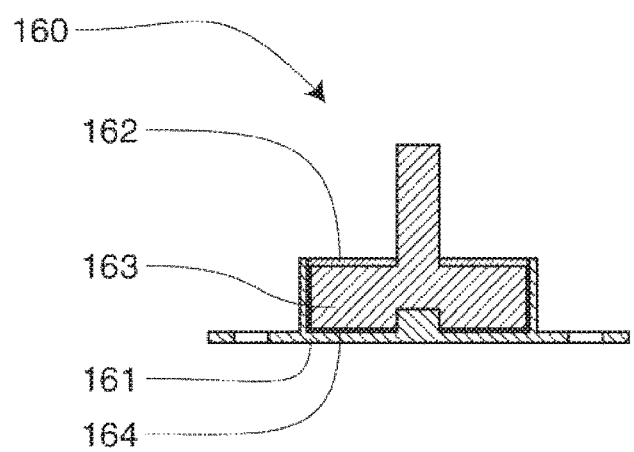
FIG. 4C is a sectional view taken along a line A-A in FIG. 4B.

FIGS. 4A to 4C schematically show a configuration of a hydraulic damper, wherein FIG. 4A is a perspective view, FIG. 4B is a front view and FIG. 4C is a sectional view taken along an arrow A-A in FIG. 4B. As shown in these drawings, the hydraulic damper 160 includes a rotation body 163 and oil 164 in its interior surrounded by a body case 161 and a cap 162. The hydraulic damper 160 utilizes a braking force generated by viscosity resistance of the oil 164. By adjusting a gap between the body case 161 and the rotation body 163, a contact area of the oil 164 and viscosity of the oil 164, it is possible to vary a braking torque (resistance) with respect to rotation of the rotation body 163. There is such a relation between a rotation speed and a braking torque of the rotation body 163 that if the rotation speed is increased, the braking torque is increased, and if the rotation speed is reduced, the braking torque is also reduced.

If the hydraulic damper 160 is used, since it utilizes the viscosity resistance of oil 164, there is a merit that change with time of characteristics such as wearing is small. It is possible to reduce influence of change in viscosity caused by a temperature by selecting a kind of oil 164, but it is possible that when wind is strong, heat of oil 164 is lost, its viscosity is increased and the braking torque is increased by taking a constitution of cooling oil 164 by wind as an example.

Figure 5A:
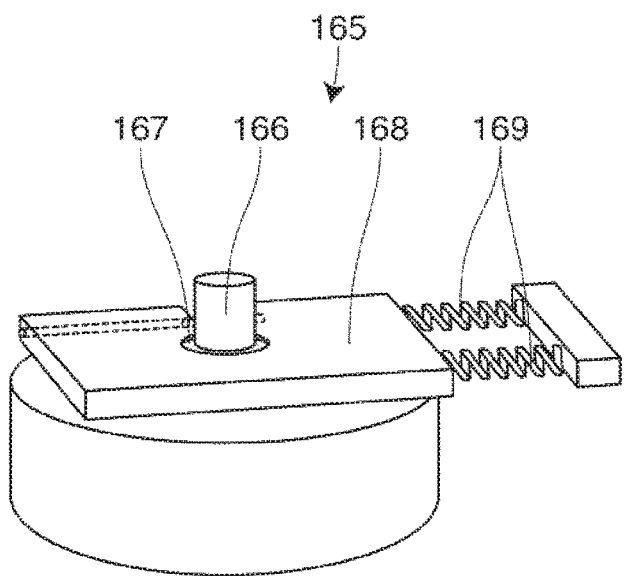
FIG. 5A is a schematic perspective view showing a configuration of a friction damper.
Figure 5B:
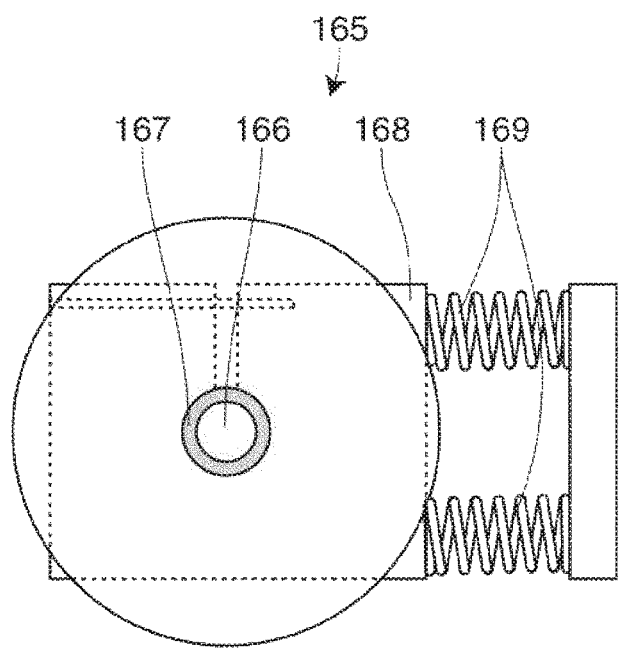
FIG. 5B is a schematic front view showing a configuration of the friction damper.

FIGS. 5A and 5B schematically show a configuration of a friction damper, wherein FIG. 5A is a perspective view and FIG. 5B is a front view. As shown in these drawings, the friction damper 165 includes a friction material 167 which is in contact with an outer surface of a rotation shaft 166, a rotation shaft-connecting material 168 which surrounds the friction material 167, and an elastic body 169 which pushes the rotation shaft-connecting material 168 in a predetermined direction. The friction damper 165 utilizes a braking force generated by friction resistance between the rotation shaft 166 and the friction material 167. By adjusting friction resistance and contact areas between the rotation shaft 166 and the friction material 167, it is possible to vary a braking torque (resistance). There is such a relation between a rotation speed and a braking torque of the rotation shaft 166 that if the rotation speed is increased, the braking torque is increased, and if the rotation speed is reduced, the braking torque is also reduced.

When the friction damper 165 is used, there are merits that a sealing portion is unnecessary and thus the configuration can be simplified, and in an environment that an ambient temperature is largely varied, characteristics can relatively stably be maintained. Even if a size of the friction material 167 is varied due to wearing, a braking force can constantly be maintained correspondingly by means of a biasing force of the elastic body 169. That is, even if the size of the friction material 167 is varied due to friction, the elastic body 169 biases the friction material 167 and friction resistance between the rotation shaft 166 and the friction material 167 can constantly be maintained.

The floating body 31 is moored to the anchors 33 provided on the sea bottom B by means of the mooring lines 32 in water by a mooring method of restraining the floating body 31 from rotating around the center axis. Hence, rotation of the floating body 31 in water is suppressed. This mooring method will be described later.

There is a floating offshore wind turbine including an apparatus which actively controls rotation of the nacelle to conform to a wind direction. In this facility, a wind turbine is temporalily fixed to the floating body and held at a position conforming to the wind direction, i.e., a position where a rotation plane is in contradiction to wind. Hence, the floating body tries to rotate around a vertical rotation axis by gyro moment caused by a gyro effect of the rotor of the wind turbine. Therefore, a mooring method which suppresses rotation motion of the floating body around its center axis suppresses this yawing. According to this, it is possible to suppress the adverse influence on the power generating efficiency of the floating offshore wind turbine and endurance of the devices thereof.

However, there is another floating offshore wind turbine of a method in which the apparatus which actively controls rotation of the nacelle is omitted and a nacelle is made to conform to a wind direction by a weathercock effect. In such a facility, a rotation shaft of a rotor of a wind turbine is supported such that the rotation shaft can freely turn with respect to a floating body. Hence, even if yawing of the floating body is suppressed, yawing caused by a gyro effect generated in the nacelle can not be suppressed. Therefore, in the floating offshore wind turbine 10 of this embodiment, the yawing suppressing means 16 is provided, thereby suppressing the yawing generated in the nacelle 13 by the gyro effect.

The mooring method of restraining the floating body 31 from rotating around its rotation axis will be described with reference to FIGS. 6A, 6B and 7.

Figure 6A:
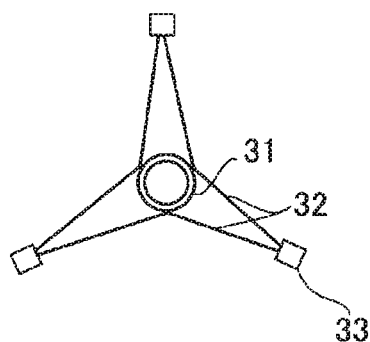
FIG. 6A is a plan view showing a configuration of a mooring apparatus of the floating body according to the first embodiment of the invention.
Figure 6B:
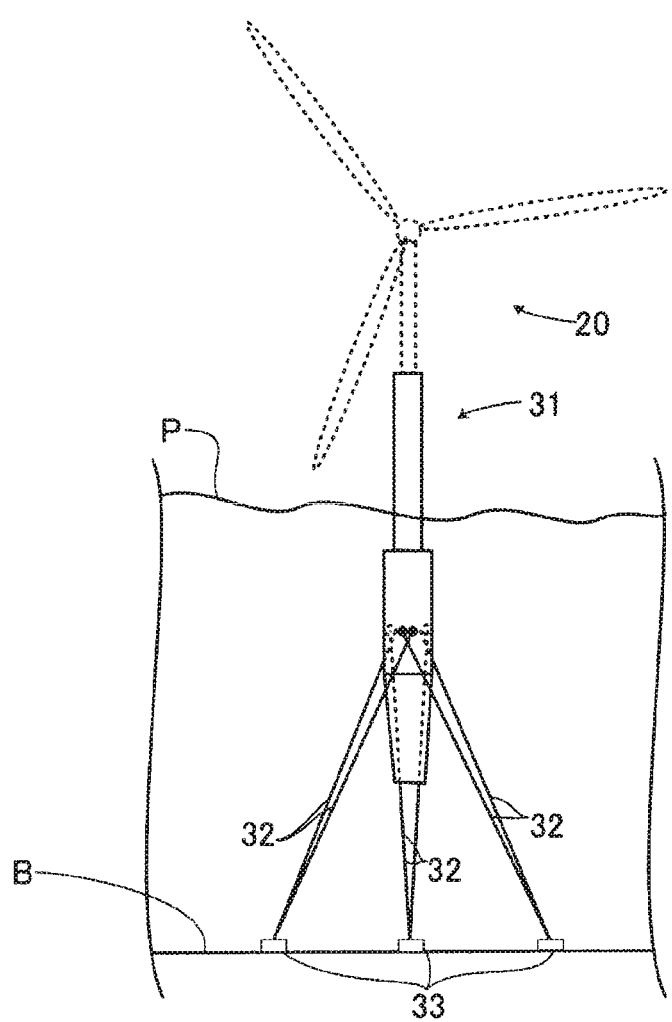
FIG. 6B is a side view showing a configuration of the mooring apparatus of the floating body according to the first embodiment of the invention.

FIGS. 6A and 6B show a configuration of a mooring apparatus of the floating body according to the first embodiment, wherein FIG. 6A is a plan view and FIG. 6B is a side view. Here, in FIG. 6A, the mooring apparatus of the floating body is projected onto a horizontal plane. One ends of the plurality of mooring lines 32 are connected to the floating body 31. The other ends of the mooring lines 32 are connected to the anchors 33 provided in water.

The floating body 31 is formed into a substantially cylindrical shape. A pair of mooring lines composed of the two mooring lines 32 is used. One ends of the two mooring lines 32 are connected to two points on a circumference of a circle of the substantially cylindrical shape when the floating body 31 is projected onto the horizontal plane. The two mooring lines 32 are formed into substantially tangent lines of the circle, and the mooring lines 32 extend on the same side. According to this, it is possible to avoid a case where when the yawing suppressing means 16 suppresses yawing, a force is applied to the floating body 31 and yawing is generated in the floating body 31.

Figure 7:
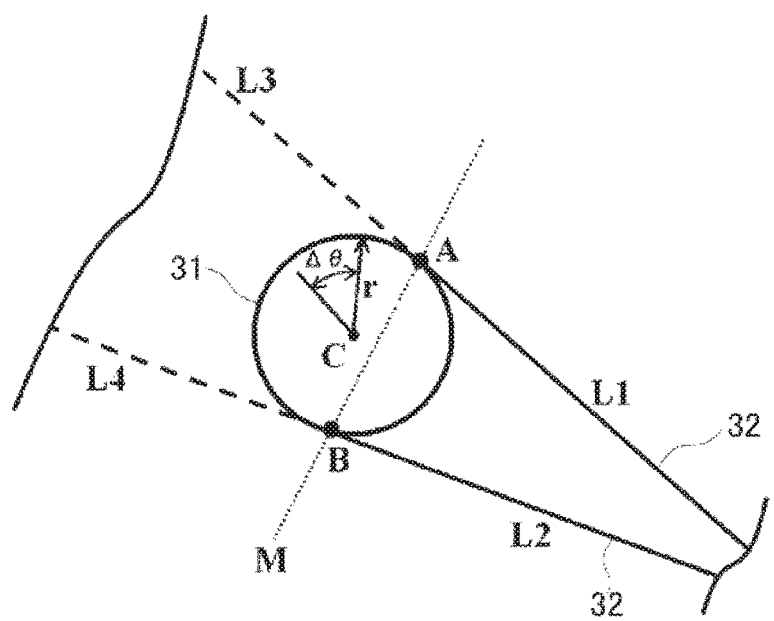
FIG. 7 is a diagram showing a configuration of a pair of mooring lines in the first embodiment of the invention.

FIG. 7 shows a relation between the floating body 31 and the two mooring lines 32 connected to lower right anchors 33 in the plan view (projection view on horizontal plane) of FIG. 6A. One ends of the two mooring lines 32 are connected to points A and B on the circumference of the floating body 31. The mooring lines 32 are formed into tangent lines L1 and L2 in the points A and B.

In this configuration, when rotation around a center C of the floating body 31 is generated in the floating body 31, one of the two mooring lines 32 extends and a tensile force acts. When a radius of the floating body 31 is defined as r and a rotation angle of the floating body 31 is defined as Δθ, an extension amount ΔL of the mooring line 32 on the extension side in this plan view is obtained by the following equation (1):

$$\Delta L = r \times \Delta \theta \ldots \quad (1)$$

In this case, if a spring rate of the mooring line 32 is defined as k, a tensile force T of the floating body 31 in a tangential direction is obtained by the following equation (2) by Hooke's law:

$$T = k \cdot \Delta L \ldots \quad (2)$$

A torque N generated by this extension is obtained by the following equation (3):

$$N = T \cdot r \ldots \quad (3)$$

If configurations of the two mooring lines 32 are as shown in FIG. 7, a torque which rebels against rotation can be generated irrespective of a rotation direction. Hence, rotation of the floating body 31 is suppressed.

In FIGS. 6A and 6B, the mooring lines 32 are formed into the tangent lines L1 and L2 in FIG. 7. However, it is apparent that even if the mooring lines 32 are formed into L3 and L4 (broken lines) in FIG. 7, the same effect can be exerted.

Figure 8A:
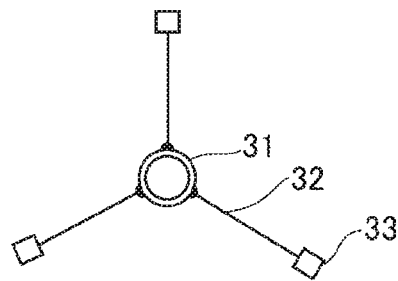
FIG. 8A is a plan view showing a configuration of a conventional tension mooring method.
Figure 8B:
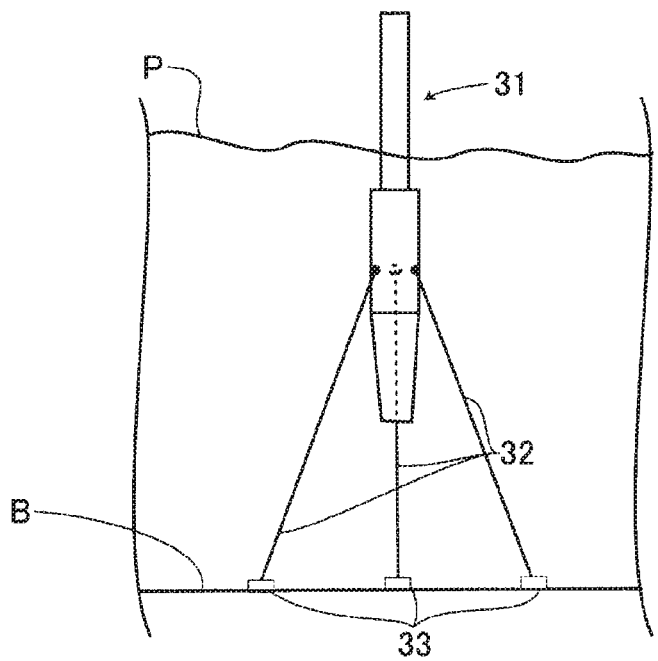
FIG. 8B is a side view showing a configuration of the conventional tension mooring method.

FIGS. 8A and 8B show a configuration of a conventional simple tension mooring method. It is apparent that motion (floating motion) of the floating body 31 in the horizontal direction is suppressed by mooring lines 32 which radially extend in three directions shown in FIG. 8. However, in the plan view (FIG. 8A), since an angle formed between a rotation direction (circumferential direction) of the floating body 31 and the mooring line 32 is substantially 90°, it is difficult to suppress the rotation. Hence, the mooring method shown in FIGS. 8A and 8B does not suppress rotation of the floating body 31 around its center axis.

(Second Embodiment)

A second embodiment of the invention will be described below with reference to FIG. 9. A yawing suppressing apparatus of a wind turbine of the second embodiment is different from the yawing suppressing apparatus of the first embodiment in a configuration where a coning angle is given to a rotor. The same numbers are allocated to the members described in the first embodiment, and explanation thereof will be omitted in the second embodiment.

Figure 9:
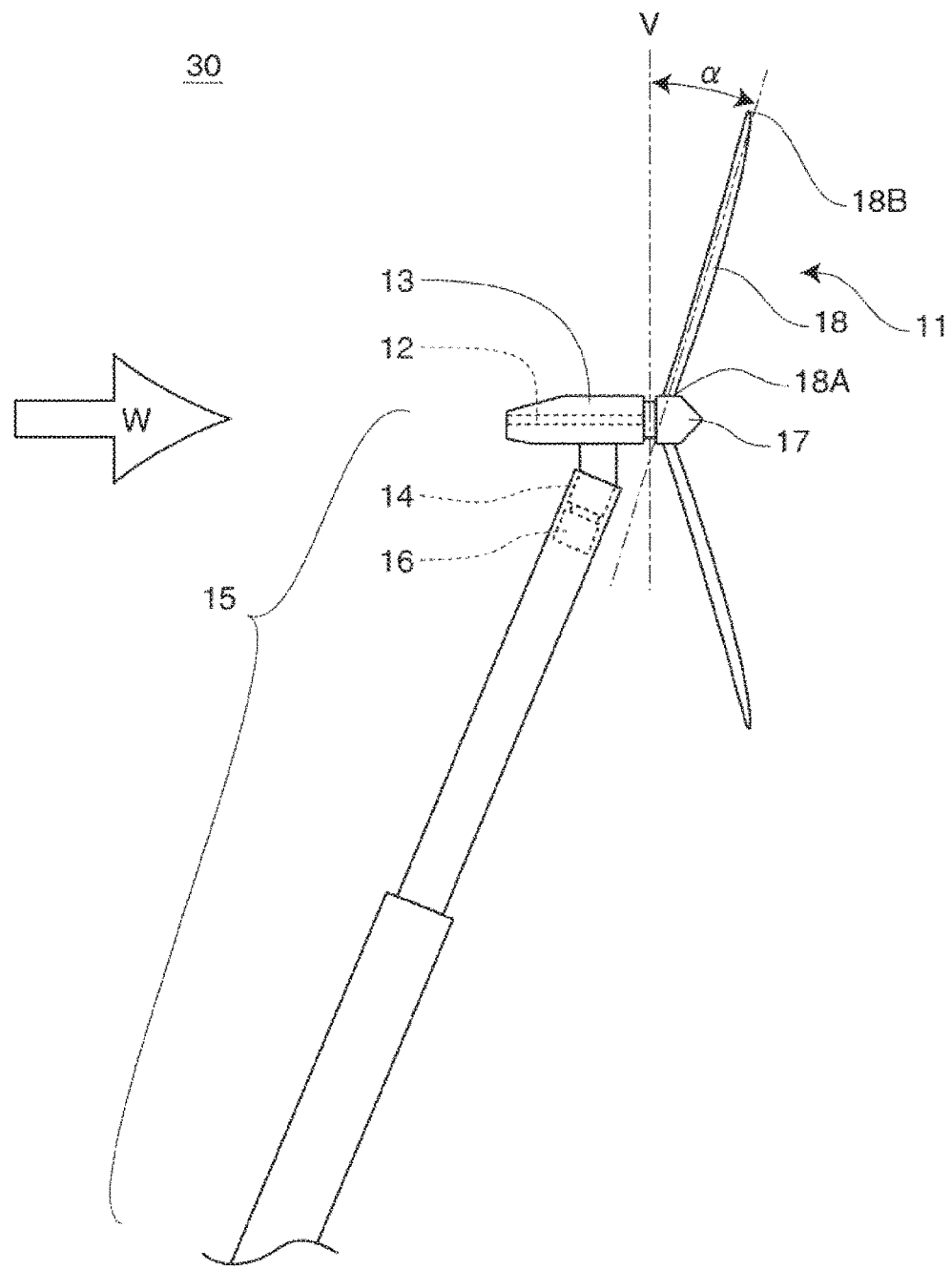
FIG. 9 is a side view of essential portions showing a structure of a yawing suppressing apparatus of a wind turbine according to a second embodiment of the invention.

FIG. 9 is a side view of essential portions showing a structure of the yawing suppressing apparatus 30 of the wind turbine according to the second embodiment. As shown in FIG. 9, according to the yawing suppressing apparatus 30 of the embodiment, a nacelle 13 is provided on a windward side as compared with a rotor 11. A coning angle α is given to the rotor 11. Here, the coning angle α is an angle between a straight line which connects a connected portion 18A of a blade 18 with respect to a hub 17 and a tip end 18B and which is shown by an alternate long and short dash line and a vertical line V shown by an alternate long and short dash line in the drawing.

According to this configuration, the nacelle 13 supported by a turning seated bearing 14 is automatically turned in accordance with change of a wind direction W in a state where the nacelle 13 can freely turn in the horizontal direction, and a weathercock effect for conforming a rotation shaft 12 of a rotor 11 to the wind direction can be enhanced. When an axial direction of the rotation shaft 12 and a wind direction conform to each other, a rotation plane of the rotor 11, i.e., a plane formed by a locus of the tip end 18B of the blade 18 is perpendicular to the wind direction substantially at right angles. If the weathercock effect is enhanced, a load of yawing suppressing means 16 is further reduced.

When the present invention is carried out as the floating offshore wind turbine (see FIG. 1) including the yawing suppressing apparatus 30, it is preferable to employ such a configuration that the rotation shaft 12 of the rotor 11 in an electricity generating state where the rotation shaft 12 receives wind and inclines is located on a horizontal plane H. This configuration will be described with reference to FIGS. 10A and 10B.

Figure 10A:
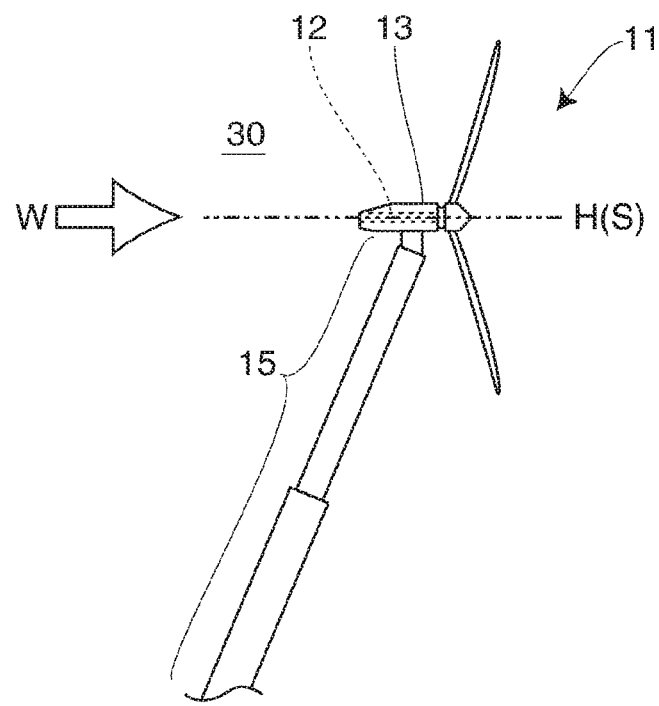
FIG. 10A is a schematic side view showing a configuration in a state where the yawing suppressing apparatus possessed by a floating offshore wind turbine according to the second embodiment of the invention receives wind.
Figure 10B:
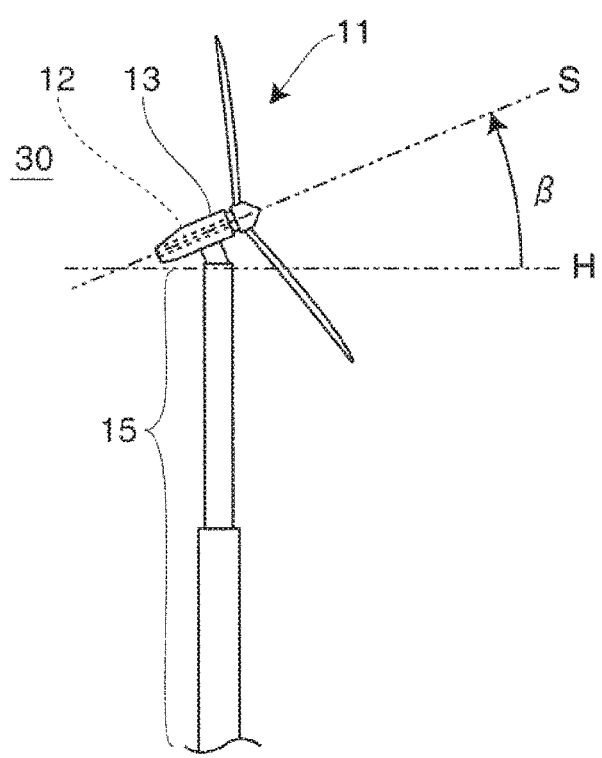
FIG. 10B is a schematic side view showing a configuration in a state where the yawing suppressing apparatus possessed by the floating offshore wind turbine according to the second embodiment of the invention does not receive wind.

FIGS. 10A and 10B schematically show a configuration of the yawing suppressing apparatus 30 provided in the floating offshore wind turbine of the embodiment, wherein FIG. 10A is a side view in a state where wind is received and FIG. 10B is a side view in a state where wind is not received. As shown in FIG. 10A, according to the yawing suppressing apparatus 30 of the embodiment, the rotation shaft 12 (straight line in the axial direction is shown by S) of the rotor 11 in the electricity generating state where the rotation shaft 12 receives wind and inclines is located on the horizontal plane H. According to this, a direction of the rotation axis of the rotation shaft 12 can conform to the wind direction W (both of them can be parallel to each other). Hence, in the state where wind is not received as shown in FIG. 10B, the nacelle 13 is supported by a tower 15 such that the rotation shaft 12 (straight line S) of the rotor 11 forms a predetermined angle β with respect to the horizontal plane H.

The predetermined angle β may be set based on the most general wind speed so that power generating efficiency of the floating offshore wind turbine becomes excellent. Further, control means of the predetermined angle β which varies the predetermined angle β such that the predetermined angle β becomes the optimal angle in accordance with a wind speed may be provided.

The configuration described with reference to FIGS. 10A and 10B can also be used in the floating offshore wind turbine using the yawing suppressing apparatus 20 described in the first embodiment.

(Third Embodiment)

A third embodiment of the invention will be described below with reference to FIGS. 11 and 12. In the third embodiment, a case where the invention is carried out as a floating offshore wind turbine will be described. The same numbers are allocated to the members described in the first or second embodiment, and explanation thereof will be omitted in the third embodiment.

Figure 11:
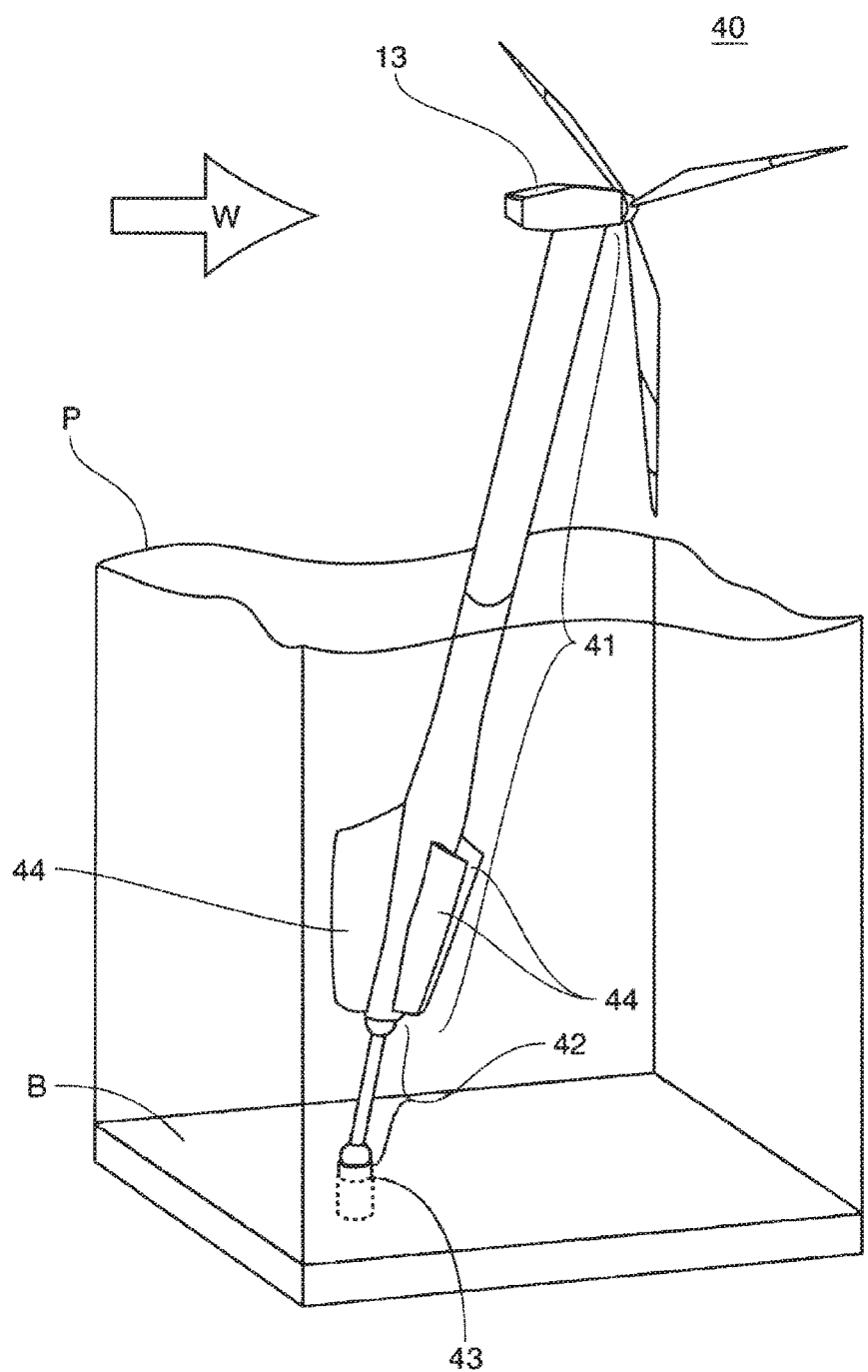
FIG. 11 is a schematic perspective view showing a configuration of a floating offshore wind turbine according to a third embodiment of the invention.

FIG. 11 is a schematic perspective view showing a configuration of a floating offshore wind turbine 40 according to the third embodiment. As shown in FIG. 11, the floating offshore wind turbine 40 is configured such that a nacelle 13 and a structure body 41 are integrally formed together so that the nacelle 13 does not turn with respect to the structure body 41. The structure body 41 floats on water, the nacelle 13 is fixed to an upper end of the structure body 41, and a lower end of the structure body 41 is connected to anchors 43 provided on a sea bottom B through turning means 42. The turning means 42 is for connecting the structure body 41 to the anchors 43 such that the structure body 41 can turn in accordance with change in the wind direction W, and the turning means 42 makes the structure body 41 exert a weathercock effect.

Hydrodynamic dampers 44 are provided on an outer side of the structure body 41. The structure body 41 is moored by a mooring method which does not suppress rotation of the structure body 41 around its center axis. By locating the hydrodynamic dampers 44 in water, a function as yawing suppressing means can be exerted. That is, resistance of each of the hydrodynamic dampers 44 having a blade shape against water becomes smaller with respect to slow yawing of the structure body 41 and becomes greater with respect to fast yawing. Hence, it is possible to selectively attenuate and suppress the yawing of the structure body 41 caused by a gyro effect which is fast yawing. By providing the structure body 41 with the hydrodynamic dampers 44 in this manner, it is possible to suppress yawing of the structure body 41 caused by a gyro effect. To suppress yawing of the structure body 41, the structure body 41 may be provided with the hydraulic damper 160 (see FIGS. 4A to 4C) or the friction damper 165 (see FIGS. 5A and 5B). It is also possible to moor the structure body 41 also using another mooring method which does not suppress rotation of the structure body 41 around its center axis by means of mooring lines.

Although the hydrodynamic dampers 44 are applied to the floating offshore wind turbine in the third embodiment, it is also possible to apply the hydrodynamic dampers 44 to a wind turbine installed on the ground for example. In this case, turning means is supported in a state where the structure body floats in water in a pool such that the structure body can turn with respect to a ground surface, and the water in the pool provided in a periphery and the hydrodynamic dampers 44 are made to mutually interfere. According to this, the hydrodynamic dampers 44 can exert function as yawing suppressing means also in the wind turbine installed on the ground.

Figure 12:
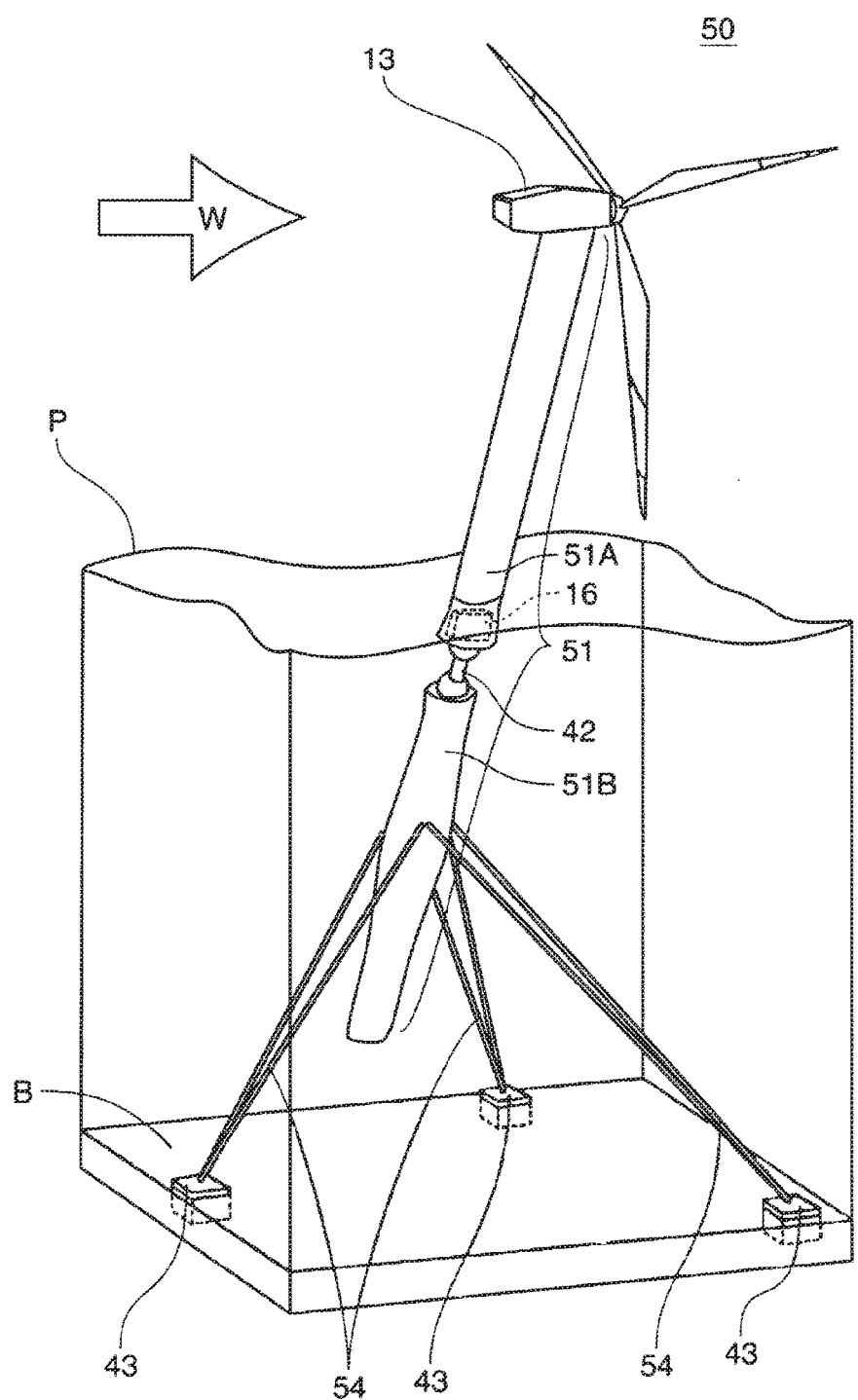
FIG. 12 is a schematic perspective view showing a configuration of the floating offshore wind turbine according to the third embodiment of the invention.

FIG. 12 is a schematic perspective view showing a configuration of a floating offshore wind turbine 50 having a configuration different from that of the floating offshore wind turbine 40 according to the third embodiment. As shown in FIG. 12, in the floating offshore wind turbine 50, an upper portion 51A of a structure body 51 and the nacelle 13 are integrally formed together, and the turning means 42 is provided between the structure body upper portion 51A and a structure body lower portion 51B. The structure body lower portion 51B located lower than the turning means 42 is fixed to the anchors 43 on the sea bottom B through a plurality of mooring lines 54.

According to this configuration, since the structure body upper portion 51A can turn in accordance with change of the wind direction W by the turning means 42, it is possible to exert a weathercock effect. The yawing suppressing means 16 provided in the structure body 51 can suppress yawing of the nacelle 13 by a gyro effect. It is also possible to moor the structure body upper portion 51A also using another mooring method which does not suppress rotation around a center axis by means of mooring lines.

(Fourth Embodiment)

A fourth embodiment of the invention will be described below with reference to FIG. 13. In the fourth embodiment, a configuration in which a floating offshore wind turbine is moored by a mooring method that does not suppress rotation of a floating body around its center axis will be described. The same numbers are allocated to the members described in the first to third embodiments, and explanation thereof will be omitted in the fourth embodiment.

Figure 13:
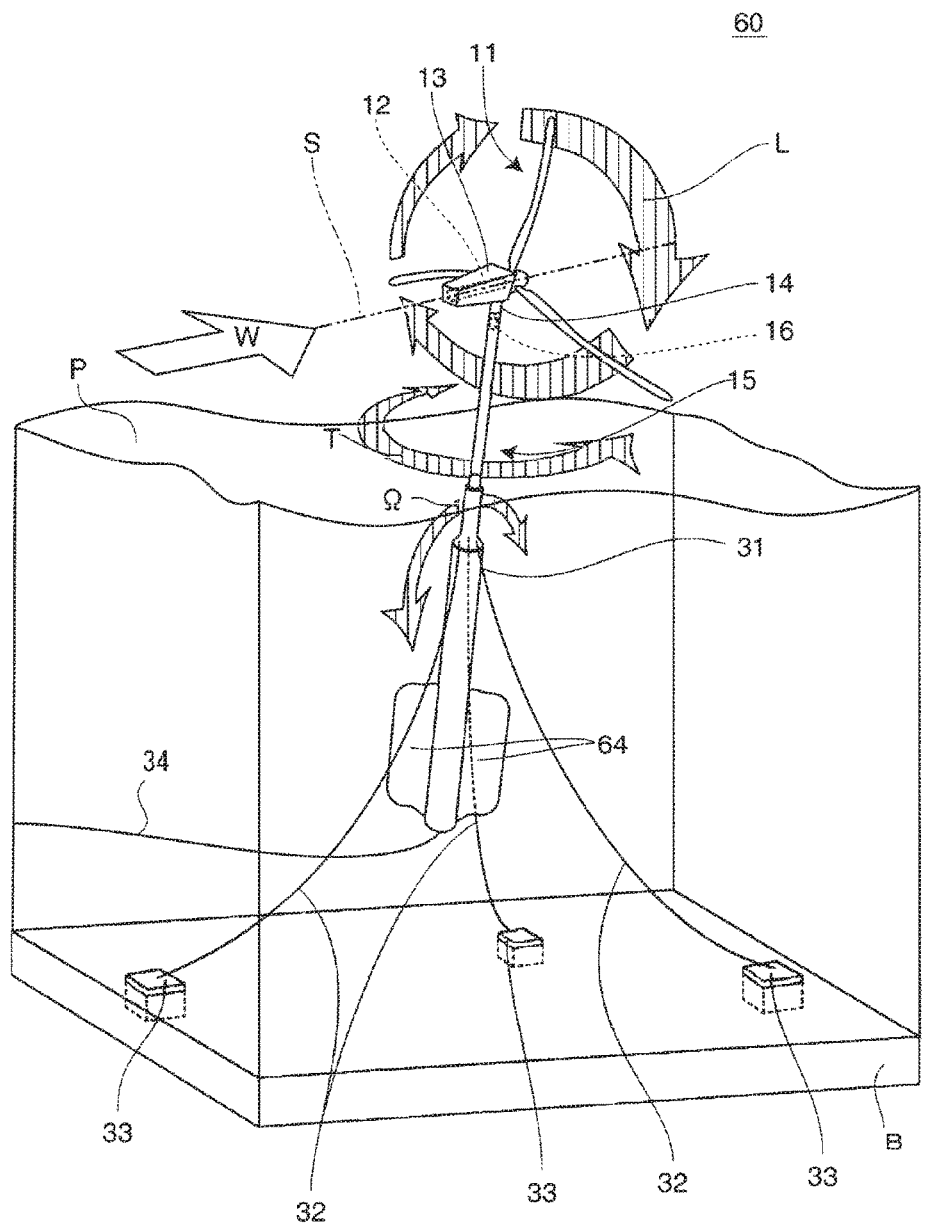
FIG. 13 is a schematic perspective view showing a configuration of a floating offshore wind turbine according to a fourth embodiment of the invention.

FIG. 13 is a schematic perspective view showing a configuration of a floating offshore wind turbine according to the fourth embodiment. As shown in FIG. 13, a floating body 31 of a floating offshore wind turbine 60 of the fourth embodiment is moored to a sea bottom B by mooring lines 32 by means of a so-called catenary method. Therefore, the floating body 31 can yawing around its center axis to some extent. That is, the floating body 31 is moored by a mooring method not suppressing rotation around its center axis. Hence, even if the yawing suppressing means 16 constrains yawing of a nacelle 13 with respect to the floating body 31 generated by a gyro effect, the floating body 31 can yawing around its center axis to some extent. As a result, the mooring lines 32 can not suppress the yawing of the nacelle 13. However, the floating body 31 of the floating offshore wind turbine 60 is provided with a plurality of blade-shaped hydrodynamic dampers 64. The hydrodynamic dampers 64 can restrain the floating body 31 from generating the yawing.

When the floating offshore wind turbine is moored by the mooring method which does not suppress rotation of the floating body around its center axis, if the yawing suppressing means 16 which is for suppressing yawing of the nacelle 13 in the turning seated bearing 14 and the hydrodynamic dampers 64 which are for suppressing yawing of the floating body 31 are combined with each other, it is effective for suppressing yawing of the nacelle 13 and the floating body 31 caused by a gyro effect.

In the floating offshore wind turbine 60 of the fourth embodiment, the two hydrodynamic dampers 64 are disposed such that they are opposed to each other through the floating body 31. That is, a line connecting mounted portions of the two hydrodynamic dampers 64 to the floating body 31 passes a substantially center of a cross section which is parallel to a horizontal plane of the floating body 31. This is because that the hydrodynamic dampers 64 are provided not for suppressing pitching of the floating body 31 but for suppressing yawing of the floating body 31. That is, the hydrodynamic dampers 64 of the floating offshore wind turbine 60 are provided so that the hydrodynamic dampers 64 interfere with outside water and become resistance of yawing of the floating body 31. Therefore, it is unnecessary to provide three or more hydrodynamic dampers 64 unlike a case where the hydrodynamic dampers 64 are provided for suppressing the pitching. Hence, even if the number of hydrodynamic dampers 64 is one, the same function is exerted. However, since the same function is exerted eve if the number of the hydrodynamic dampers 64 is three or more, the number of the hydrodynamic dampers 64 may be three or more.

In the fourth embodiment, even if an apparatus which actively controls rotation of the nacelle is provided instead of the yawing suppressing means 16, it is possible to restrain the floating body 31 from generating yawing by the hydrodynamic dampers 64. The hydrodynamic dampers 64 generate a hydrodynamic effect by interference with surrounding fluid and exert a function as yawing suppressing means. Hence, a shape of a cross section of the structure body itself may be an angular shape or a shape having many concavo-convex portions.

INDUSTRIAL APPLICABILITY

The present invention can be utilized as an apparatus for enhancing power generating efficiency of a wind turbine and endurance of devices thereof. Especially, the invention is useful for enhancing power generating efficiency of a floating offshore wind turbine and endurance of devices thereof.

The invention claimed is:

1. A floating offshore wind turbine which generates electricity using a floating body as a portion of a structure body on ocean, comprising:
   a rotor which is rotated by wind,
   a nacelle in which at least a rotation shaft of the rotor is accommodated,
   wherein the structure body is in shape of a tower, includes a turning seated bearing which
   supports the nacelle such that the nacelle can turn with respect to a water surface,
   a hydrodynamic damper, which is provided on the structure body and suppresses yawing of the nacelle with respect to the water surface by mutual interference between a blade-shaped structure provided directly in a lower part of the structure body and peripheral fluid,
   a hydraulic damper or friction damper, which is provided between the nacelle and the structure body where the hydrodynamic damper is provided and suppresses the yawing of the nacelle, and
   a plurality of mooring lines with which the structure body is moored to anchors on a bottom of water.

2. The floating offshore wind turbine according to claim 1 wherein the nacelle is provided on a windward side as compared with the rotor.

3. The floating offshore wind turbine according to claim 2, wherein a coning angle is given to the rotor.

4. The floating offshore wind turbine according to claim 1, wherein the floating body is formed into a substantially cylindrical shape, the plurality of mooring lines are composed of pairs of mooring lines whose one ends are connected to two points on a circumference of a circle of the substantially cylindrical shape and the pairs of mooring lines are formed into substantially tangent lines of the circle and extend on the same side when the floating body is projected onto a horizontal plane.

5. The floating offshore wind turbine according to claim 1, wherein the nacelle is supported by the structure body such that a predetermined angle is formed between a horizontal plane and the rotation shaft of the rotor in a state where wind is not received so that the rotation shaft of the rotor in a state where wind is received becomes parallel to a wind direction.

* * * * *